C. A. WEED & R. D. BELL.
HARVESTER REEL.
No. 188,704. Patented March 20, 1877.
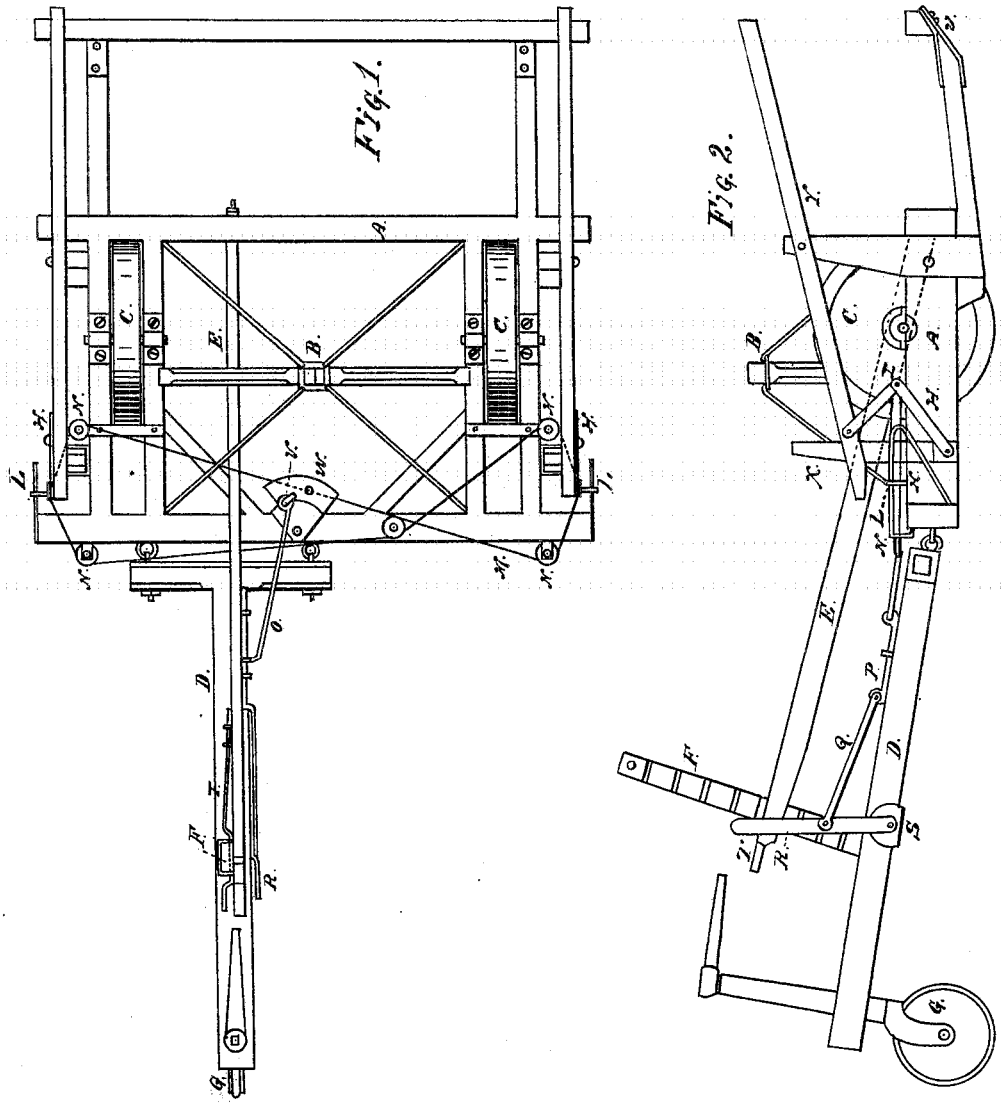
WITNESSES:
A. Bates
J. E. Ferguson
INVENTORS:
Clinton A. Weed
Robert D. Bell

UNITED STATES PATENT OFFICE.

CLINTON A. WEED AND ROBERT D. BELL, OF RACINE, WISCONSIN, ASSIGNORS TO J. I. CASE & CO., OF SAME PLACE.

IMPROVEMENT IN HARVESTER-REELS.

Specification forming part of Letters Patent No. 188,704, dated March 20, 1877; application filed December 15, 1876.

*To all whom it may concern:*

Be it known that we, CLINTON A. WEED and ROBERT D. BELL, of Racine, in the county of Racine, in the State of Wisconsin, have invented certain Improvements in Grain-Heading Machines, of which the following is a specification:

The object of our invention is an arrangement of machinery for cutting the heads of grain in a harvest-field, with arms or levers to sustain a reel, with standard and jointed connection, a bar and slide, a runner, rope, and pulleys, a quadrant, rods, and lever for the adjustment of the reel.

Figure 1 is a plan view of our invention, and Fig. 2 is a side view of the same.

A represents the frame of the machine; B, the truss in the center of the same; C, the wheels which support the frame of the machine; D, the tongue, secured to the frame by eyebolts; E, a lever, by which the front part of the machine is raised and lowered, the frame resting on the axle-trees and rocking on the same, and as the rear portion of the frame is raised the front part will be lowered, and the sickle-bar and reel will be brought nearer to the ground; F, a standard in the tongue, with notches in it; G, a wheel under the end of the tongue, upon which the tongue rests, and by which it is kept up to a uniform height; H, a jointed connection, one end secured to a standard, X, on the rearward part of the frame, and the other end to a lever, Y, which is pivoted in the center to a standard on the forward part of the frame. These levers support the reel. A bar, I, is attached to the center joint of the connection H at one end, and at the other to a slide, K, by a runner-eye, L. The rope or chain M runs round the pulleys N, and is attached at both ends of the same to bars I on both sides of the machine, so that the rope M forms an endless rope running across the machine, and is operated by a quadrant, W, to which the rope is attached. A rod, O, is attached to one side of the quadrant, and the inside of the quadrant is attached to the frame of the machine by a bolt, on which it turns, so that as the rod O is pushed out it pulls one way on the rope, pushes the bars I forward, shuts up the connection H, pulls down on the ends of lever Y, lifts the other end of the lever, and thus lifts the reel farther from the sickle-bar. P, a slide on the tongue, secured to the tongue by staples, under which it slides. One end of the bar O is attached to an eye on the slide P, and a connecting-rod, Q, is attached to an eye on the opposite end of said slide. The other end of said rod Q is attached to lever R. This lever R is attached to the tongue D at its lower end by a pin, S, and the rod Q is attached to lever R at about one-third the distance from pin S to the upper end of the same, so that as the upper end of lever R is moved forward or back, it will turn the quadrant and pull on the rope M, and open or close the connection H.

T is a spring-catch on the side of lever E, which fits into the slots on the standard F, and holds the lever E at any point at which it may be placed, and thus the sickle-bar is adjusted so as to cut the heads of grain as high from the ground as may be necessary.

The eye V in the quadrant is adjustable by being placed out or in the holes in the quadrant, to pull the rope M farther or shorter, as may be desired.

The operation of this machine is as follows: The horses being hitched to same, the end of lever E is raised so as to bring the sickle-bar the proper distance from the ground to cut the heads of grain as long as may be desirable. As the lever is raised the quadrant is turned in one direction, and pulls on the rope M, so as to straighten out the connection H and bring the reel nearer to the sickle-bar, so as to press the heads of grain against the sickle and cut them off.

The apron to carry off the grain-heads and the sickle and reel are not illustrated, as they form no part of the claims in this application.

It will be seen that all parts of this machine work without much strain, there being no part of same under constant strain, which in time disintegrates the material and causes it to break.

What we claim as new and our invention is—

1. The combination of reel-bearing arms or levers Y, standard X, jointed connection H, bar I, slide K, runner L, rope M, and pulleys N, substantially as and for the purpose described.

2. The combination of lever Y, standard X, connection H, bar I, slide K, runner L, rope M, pulleys N, quadrant W, slide P, rods O and Q, and lever R, substantially as and for the purpose described.

CLINTON A. WEED.
ROBERT D. BELL.

Witnesses:
A. BATES,
J. E. FERGUSON.